US00RE43864E

(19) United States
(12) Reissued Patent
Watanabe et al.

(10) Patent Number: US RE43,864 E
(45) **Date of Reissued Patent: *Dec. 18, 2012**

(54) METHOD AND APPARATUS FOR ATTENUATING FUEL PUMP NOISE IN A DIRECT INJECTION INTERNAL COMBUSTION CHAMBER

(75) Inventors: Atsushi Watanabe, Novi, MI (US); Harsha Badarinarayan, Novi, MI (US); Jonathan Borg, Livonia, MI (US); Donald J. Mccune, Farmington Hills, MI (US); Takuya Shiraishi, West Bloomfield, MI (US); Atsushi Hohkita, Novi, MI (US); Masahiro Soma, Novi, MI (US); Hiroaki Saeki, Ibaraki-Ken (JP)

(73) Assignee: Hitachi, Ltd., Tokyo (JP)

( * ) Notice: This patent is subject to a terminal disclaimer.

(21) Appl. No.: 12/849,890

(22) Filed: Aug. 4, 2010

Related U.S. Patent Documents

Reissue of:
(64) Patent No.: 7,406,946
Issued: Aug. 5, 2008
Appl. No.: 11/695,195
Filed: Apr. 2, 2007

(51) Int. Cl.
*F02M 61/14* (2006.01)
*F02M 61/18* (2006.01)

(52) U.S. Cl. ..... 123/470; 123/456

(58) Field of Classification Search ..... 123/470, 123/456, 447, 467, 469, 468; 239/88–92, 239/600

See application file for complete search history.

(56) References Cited

U.S. PATENT DOCUMENTS

| | | | | |
|---|---|---|---|---|
| 4,363,607 | A | 12/1982 | Eichele et al. | |
| 4,519,371 | A | 5/1985 | Nagase et al. | |
| 4,612,089 | A | 9/1986 | Hauptmann | |
| 4,649,884 | A | 3/1987 | Tuckey | |
| 4,719,889 | A | 1/1988 | Amann et al. | |
| 4,751,904 | A | 6/1988 | Hudson, Jr. | |
| 4,944,262 | A | 7/1990 | Molina et al. | |
| 5,035,224 | A * | 7/1991 | Hornby et al. | 123/470 |
| 5,136,999 | A | 8/1992 | Bassler et al. | |
| 5,234,569 | A | 8/1993 | Hunt | |
| 5,426,934 | A | 6/1995 | Hunt et al. | |

(Continued)

FOREIGN PATENT DOCUMENTS

DE 10 2004 049 277 A1 4/2006

(Continued)

OTHER PUBLICATIONS

European Search Report dated Sep. 7, 2009.

(Continued)

*Primary Examiner* — Mahmoud Gimie
(74) *Attorney, Agent, or Firm* — Crowell & Moring LLP

(57) ABSTRACT

A method and apparatus for attenuating fuel pump noise in a direct injection internal combustion engine. In one proposal, the direct injection fuel nozzle is suspended from a fuel rail in a fashion that avoids direct metal-to-metal contact between the injector and the engine block. The direct injection nozzle may also be connected to the fuel rail by a pair of spaced-apart seals which equalize the longitudinal pressure on the nozzle during operation. Enlarged diameter fuel reservoirs and/or a restricted orifice may be provided fluidly in series between the fuel pump and the direct injection nozzle in order to attenuate noise resulting from fuel pump pulsation.

27 Claims, 6 Drawing Sheets

U.S. PATENT DOCUMENTS

| | | | |
|---|---|---|---|
| 5,456,233 | A | 10/1995 | Felhofer |
| 5,465,701 | A | 11/1995 | Hunt |
| 5,482,023 | A | 1/1996 | Hunt et al. |
| 5,520,151 | A | 5/1996 | Gras et al. |
| 5,529,035 | A | 6/1996 | Hunt et al. |
| 5,535,724 | A | 7/1996 | Davis |
| 5,598,826 | A | 2/1997 | Hunt et al. |
| 5,630,400 | A | 5/1997 | Sumida et al. |
| 5,806,494 | A | 9/1998 | Glassey |
| 5,894,832 | A | 4/1999 | Nogi et al. |
| 5,909,725 | A | 6/1999 | Balsdon et al. |
| 5,970,953 | A | 10/1999 | Lorraine et al. |
| 6,050,236 | A | 4/2000 | Sawaki et al. |
| 6,053,149 | A | 4/2000 | Lorraine |
| 6,109,247 | A | 8/2000 | Hunt |
| 6,213,096 | B1 | 4/2001 | Kato et al. |
| 6,276,339 | B1 | 8/2001 | Shebert, Jr. |
| 6,279,549 | B1 | 8/2001 | Hunt et al. |
| 6,314,943 | B1 | 11/2001 | Burch et al. |
| 6,401,691 | B1 | 6/2002 | Kawano et al. |
| 6,427,667 | B1 | 8/2002 | Kato |
| 6,494,186 | B1 | 12/2002 | Wakeman |
| 6,543,421 | B2 | 4/2003 | Lorraine et al. |
| 6,604,512 | B2 | 8/2003 | Kato |
| 6,609,898 | B1 | 8/2003 | Bury |
| 6,640,784 | B1 | 11/2003 | Sims, Jr. |
| 6,666,189 | B1 | 12/2003 | Hosoya |
| 6,698,400 | B2 | 3/2004 | Kurtenbach et al. |
| 6,705,292 | B2 | 3/2004 | Bugos |
| 6,736,103 | B2 | 5/2004 | Hunt et al. |
| 6,745,798 | B2 | 6/2004 | Kilgore |
| 6,807,944 | B2 | 10/2004 | Mizuno et al. |
| 6,830,037 | B1 | 12/2004 | Braun et al. |
| 6,843,238 | B2 | 1/2005 | Hunt et al. |
| 6,871,634 | B2 | 3/2005 | Berger et al. |
| 6,874,467 | B2 | 4/2005 | Hunt et al. |
| 6,874,478 | B2 | 4/2005 | Minoura et al. |
| 6,901,913 | B1 | 6/2005 | Tsuchiya et al. |
| 6,904,894 | B2 | 6/2005 | Serizawa et al. |
| 6,918,383 | B2 | 7/2005 | Hunt et al. |
| 6,925,989 | B2 | 8/2005 | Treusch et al. |
| 6,948,479 | B1 | 9/2005 | Raney et al. |
| 7,007,667 | B2 | 3/2006 | Borg et al. |
| 7,017,556 | B2 | 3/2006 | Borg et al. |
| 7,261,089 | B2 | 8/2007 | Hoenig et al. |
| 7,293,550 | B2 | 11/2007 | Beardmore |
| 2003/0183200 | A1 | 10/2003 | Bugos |
| 2005/0161025 | A1 | 7/2005 | Braun et al. |
| 2006/0065245 | A1* | 3/2006 | Kawamoto et al. ..... 123/470 |
| 2006/0118091 | A1 | 6/2006 | Zdroik |
| 2007/0064403 | A1 | 3/2007 | Badarinarayan et al. |
| 2008/0302336 | A1 | 12/2008 | Fuerst et al. |
| 2009/0071445 | A1 | 3/2009 | Mueller et al. |

FOREIGN PATENT DOCUMENTS

| | | | |
|---|---|---|---|
| EP | 1 637 729 | A1 | 3/2006 |
| JP | 7-293390 | A | 11/1995 |
| JP | 10-30521 | A | 2/1998 |
| JP | 11-270430 | A | 10/1999 |
| JP | 2001-502033 | T | 2/2001 |
| JP | 2001-132576 | A | 5/2001 |
| JP | 2004-28053 | A | 1/2004 |
| JP | 2004-239124 | A | 8/2004 |
| JP | 2005-147075 | A | 6/2005 |
| JP | 2005-163627 | A | 6/2005 |
| JP | 2005-226489 | A | 8/2005 |
| WO | WO 2006/092427 | A1 | 9/2006 |

OTHER PUBLICATIONS

Japanese Office Action dated Dec. 28, 2010 (Five (5) pages).

* cited by examiner

Fig-1
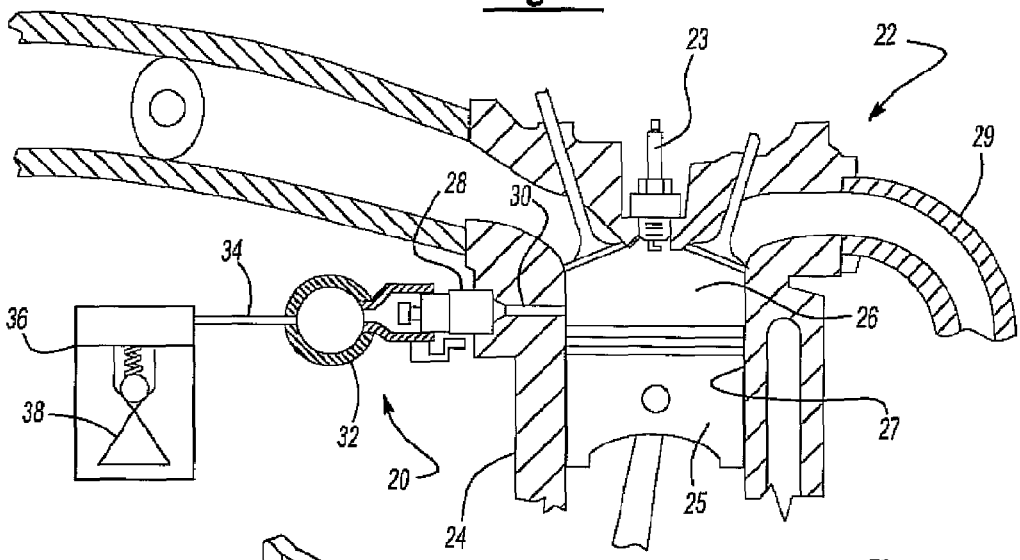
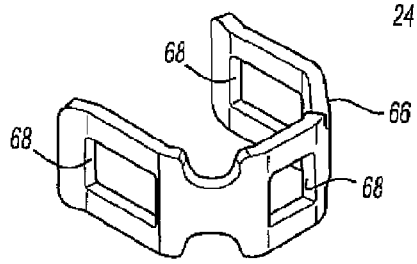
Fig-3
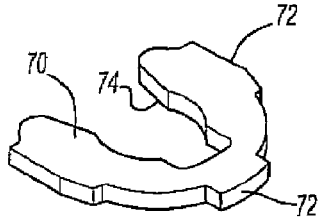
Fig-4
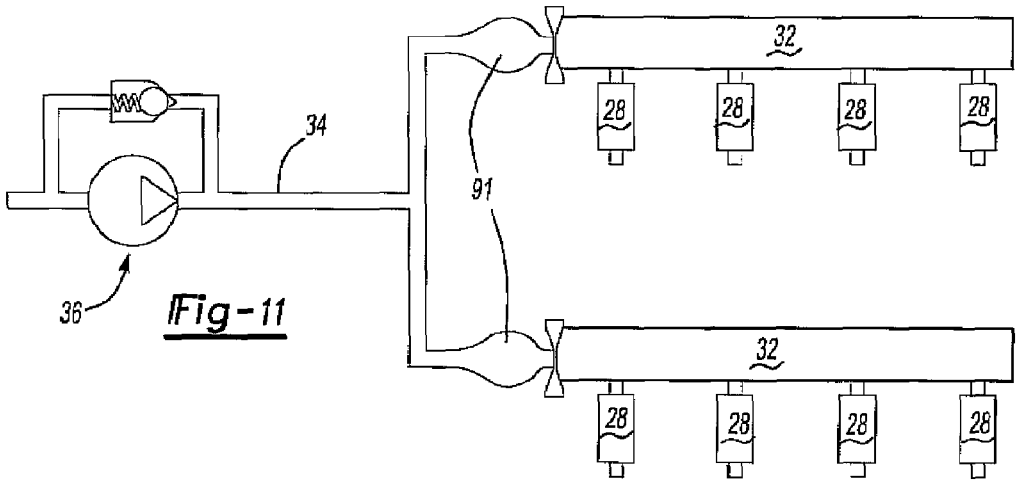
Fig-11

METHOD AND APPARATUS FOR ATTENUATING FUEL PUMP NOISE IN A DIRECT INJECTION INTERNAL COMBUSTION CHAMBER

Matter enclosed in heavy brackets [ ] appears in the original patent but forms no part of this reissue specification; matter printed in italics indicates the additions made by reissue.

BACKGROUND OF THE INVENTION

I. Field of the Invention

The present invention relates to a method and apparatus for attenuating noise resulting from fuel pump pulsation in a direct injection internal combustion engine.

II. Description of Related Art

Direct injection internal combustion engines have enjoyed increased acceptance for a variety of reasons. In particular, direct fuel injection into the engine combustion chamber typically results in better fuel economy and more efficient operation of the internal combustion engine.

In a direct injection internal combustion engine, a passageway is formed in the engine block, which includes the engine cylinder head, that is open to each combustion chamber. A direct injection fuel injector is then positioned within this passageway for each of the engine combustion chambers so that an outlet from the fuel injector is open to its associated combustion chamber.

Each fuel injector also includes an inlet that is connected by a fuel rail and typically a fuel pipe to a fuel pump. The fuel pump creates high pressure in the fuel rail and this high pressure, in turn, is fluidly connected to each fuel injector. Thus, upon activation or opening of each fuel injector, the injector injects the fuel directly into the engine combustion chamber.

One disadvantage of these previously known direct fuel injection engines, however, is that the fuel pump is typically cam driven and thus creates fuel pressure pulsations to the fuel rail. These fuel pressure pulsations, furthermore, vary in frequency in dependence upon the engine rpm. These fuel pump pulsations disadvantageously result in vibrations that are transmitted by the fuel injectors to the engine block and create an audible and undesirable noise as well as vibration and possible part fatigue.

SUMMARY OF THE PRESENT INVENTION

The present invention provides an apparatus to attenuate the audible noise and vibration created by the previously known direct injection internal combustion engines.

In one form of the invention, a direct injection fuel nozzle is associated with each engine combustion chamber in the engine block which, as used herein, includes the engine cylinder head. Each direct injection fuel nozzle, furthermore, is elongated and includes a main body with a fuel inlet at one end and a tip with a fuel outlet at its other end.

An injector cup is secured to the fuel rail which, in turn, is fluidly connected to the fuel pump. Each injector cup, furthermore, includes an open end cavity with the fuel rail and is dimensioned to receive a portion of the main body of the fuel injector. This portion of the fuel injector, furthermore, is fluidly sealed to the injector cup by an O-ring or similar seal.

An injector holder assembly then secures the fuel injector to the injector cup so that the fuel injector is suspended from the fuel rail. Simultaneously, the injector tip of the fuel injector is positioned within the engine block passageway open to the combustion chamber. However, the injector holder assembly maintains the injector tip at a position spaced from the walls of the block passageway thus avoiding metal-to-metal contact between the fuel injector and the engine block. The fuel tip is then fluidly sealed to the engine block passageway by a seal which may be non-metallic.

Since the injector holder assembly suspends its associated fuel injector from the fuel rail thus avoiding metal-to-metal contact with the engine block, fuel pressure pulsations that are transmitted to the fuel injector and can cause vibration are effectively isolated from, and thus attenuated by, the seal between the injector tip and the engine block.

In a modification of the invention, the fuel injector is mounted to the injector cup so that the fuel injector may pivot or swivel slightly relative to the injector cup. Tapered surfaces on the injector reduces the bending arm between the injector and its mounting clip and thus reduces stress.

In still another form of the present invention, the inlet for the fuel injector extends radially outwardly from the fuel injector main body at a position spaced inwardly from its end positioned within the injector cup. A pair of annular seals are then positioned between the injector main body and the injector cup such that the seals create an annular fluid chamber in communication with the injector inlet. This annular chamber in turn is fluidly connected to the fuel rail.

Consequently, during operation of the fuel rail, the high pressure within the fuel rail simultaneously imposes a force on both O-rings that are substantially equal in magnitude, but opposite in direction. As such, fuel pressure on the fuel injector in a direction towards the injector tip that would otherwise occur, together with vibrations resulting from that axial force, is avoided.

In still another form of the invention, an enlarged diameter reservoir is fluidly provided in series between the fuel pump and the fuel injectors. In one embodiment, a fuel pipe fluidly connects the fuel pump to one or more fuel rails. A reservoir is then positioned fluidly in series in the fuel pipe immediately upstream from the fuel rail. In practice, the reservoir functions to dampen and attenuate vibrations from the fuel pump before such vibrations reach the fuel rails.

In another form of the invention, the reservoir is positioned between the fuel rails and each of the fuel injectors. Such fuel reservoirs also serve to dampen the fuel pressure pulsations from the fuel pump.

In yet another form of the invention, a small diameter orifice is provided between the fuel rail and each fuel injector. These small diameter orifices also act to dampen the fuel pressure fluctuations, and thus transmission of vibration from the fuel pump and to the fuel injectors.

BRIEF DESCRIPTION OF THE DRAWING

A better understanding of the present invention will be had upon reference to the following detailed description when read in conjunction with the accompany drawing, wherein like reference characters refer to like parts throughout the several views, and in which:

FIG. 1 is a diagrammatic fragmentary view illustrating an embodiment of the present invention;

FIG. 3 is an elevational view illustrating an injector clip holder;

FIG. 4 is a elevational view illustrating an injector clip plate;

FIG. 11 is a view similar to FIG. 8, but showing a modification thereof.

DETAILED DESCRIPTION OF PREFERRED EMBODIMENTS OF THE PRESENT INVENTION

Figure 2:
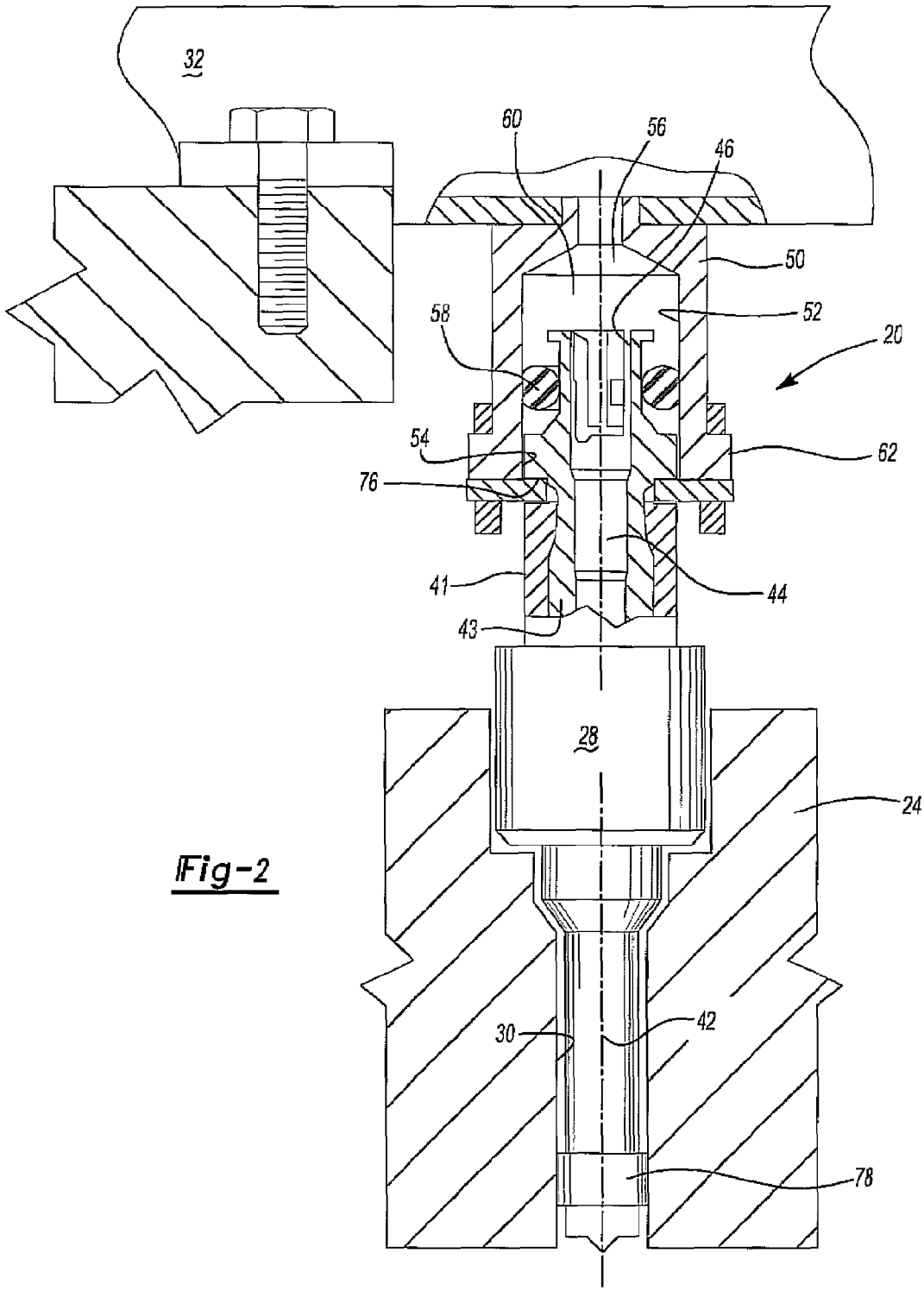
FIG. 2 is a fragmentary sectional view illustrating an embodiment of the present invention.

With reference first to FIG. 1, a fuel delivery system having a direct injection nozzle assembly 20 in accordance with one form of the present invention is illustrated for use with a direct injection internal combustion engine 22. The engine 22 includes an engine block 247 including the cylinder head, which defines at least one, and more typically several, internal combustion chambers 26.

A spark plug 23 initiates the fuel combustion in the combustion chamber 26 to drive a piston 25 reciprocally mounted in a cylinder 27 in the engine block 24. Following fuel combustion, the combustion products are exhausted through an exhaust manifold 29.

A direct injection fuel injector 28 is associated with each combustion chamber 26. Each fuel injector 28, furthermore, includes a portion mounted within a passageway 30 formed in the engine block 24 and open to the combustion chamber 26. One fuel injector 28 is associated with each combustion chamber 26.

The fuel injector 28, which will subsequently be described in greater detail, is fluidly connected to a high pressure fuel rail 32. The fuel rail 32, in turn, is fluidly connected by a fuel pipe 34 to a high pressure fuel pump 36.

The high pressure fuel pump 36 typically comprises a cam pump having a cam 38 that is rotatably driven by the engine. Consequently, operation of the pump 36 produces fuel pressure pulsations through the fuel pipe 34, rail 32 and fuel injectors 28 unless otherwise attenuated.

With reference now to FIG. 2, one direct injection fuel injector 28 is illustrated in greater detail. The injector 28 is elongated and includes a main body 40 having concentric tubular parts 41 and 43 and aligned with an injector tip 42. A fluid passageway 44 is formed through the injector 28 so that an inlet 46 to the injector 28 is open at the main body 40 while a fuel injector outlet 48 is open at the open end of the injector tip 42. Conventional means (not shown) are employed to selectively activate, i.e. open and close, the fuel injector 28 so that, when activated, fuel is injected from the outlet 48 of the fuel injector 28 into the combustion chamber 26 associated with the fuel injector 28.

In order to attach the fuel injector 28, the holder assembly 20 includes an injector cup 50 having a housing defining an interior cavity 52 open at one end 54. The other end of the cavity 52 is fluidly connected to the fuel rail 32 by a fuel port 56.

The injector cup cavity 52 is dimensioned to slidably receive a portion of the injector main body 40 through the open end 54 of the cavity 52. An O-ring or other seal 58 then fluidly seals the outer periphery of the fuel injector main body 40 to the inside of the cavity 52 thus forming a fuel inlet chamber 60. Both the injector inlet 46 and the fuel port 56 between the fuel rail 32 and injector cup 50 are open to the fuel inlet chamber 60.

With reference now to FIGS. 2-4, in order to actually attach the fuel injector 28 to the injector cup 50, the injector cup 50 includes at least two, and preferably three outwardly extending tabs 62 at spaced positions around the outer periphery of the injector cup 50. An injector clip holder 66 includes a plurality of spaced openings 68 which are dimensioned to receive the injector cup tabs 62 therethrough. The injector clip holder 66, furthermore, is constructed of a rigid material, such as metal, and is firmly secured to the injector cup 50 once the tabs 62 are positioned through the openings 68 in the clip 66.

The holder assembly further comprises an injector clip plate 70, best shown in FIG. 4. The clip plate 70 is generally planar in construction and includes a plurality of outwardly extending protrusions 72 at spaced intervals around its periphery. These protrusions 72, furthermore, are dimensioned to be received also within the openings 68 on the clip holder 66 such that the protrusions 72 flatly abut against the tabs 62 on the injection cup 50.

The clip plate 70 is constructed of a rigid material, such as metal, and includes a cutout 74 designed to fit around a portion of the main body 40 of the fuel injector 28. With the clip plate 70 positioned around the fuel injector 28, the clip plate 70 abuts against an abutment surface 76 on the fuel injector main body 40.

Consequently, in operation, the clip holder 66 secures the clip plate 70 to the injection cup 50 which, in turn, is secured to the fuel rail 32 in any conventional fashion, such as a press fit. The clip plate 70 then supports the abutment surface 76 of the fuel injector 28. In doing so, the holder assembly 20 together with the injector cup 50 suspends the fuel injector 28 from the fuel rail 32.

Referring again particularly to FIG. 2, the holder assembly 20, injector cup 50 and fuel injector 28 are all dimensioned so that with the fuel injector 28 secured to the injector cup 50 by the holder assembly 20, the tip 42 of the fuel injector 28 is positioned within the injector passageway 30 formed in the engine block but is spaced from, i.e. not in contact with, the engine block 24 thus avoiding direct contact between the fuel injector 28 and the block 24. Since the fuel injector 28 as well as the engine block 24 are conventionally formed of metal, the space in between the fuel injector 28 and the fuel injector passageway 30 thus avoids direct metal-to-metal contact between the injector 28 and block 24.

In order to seal the fuel tip 42 to the fuel injector passageway 30, a tip seal 78 is provided around the fuel tip 42 such that the tip seal 78 extends between and seals the fuel tip 42 to the passageway 30. The tip seal 78 is constructed of a non-metallic material, such as Teflon. Furthermore, the tip seal 78 may be more axially elongated than that shown in the drawing and, optionally, two or more tip seals 78 may be used with each injector 20.

In operation, since metal-to-metal contact between the fuel injector 28 and the engine block 24 is avoided, the transmission of vibrations or pulsations from the fuel pump to the engine block 24 is likewise avoided.

Figure 5:
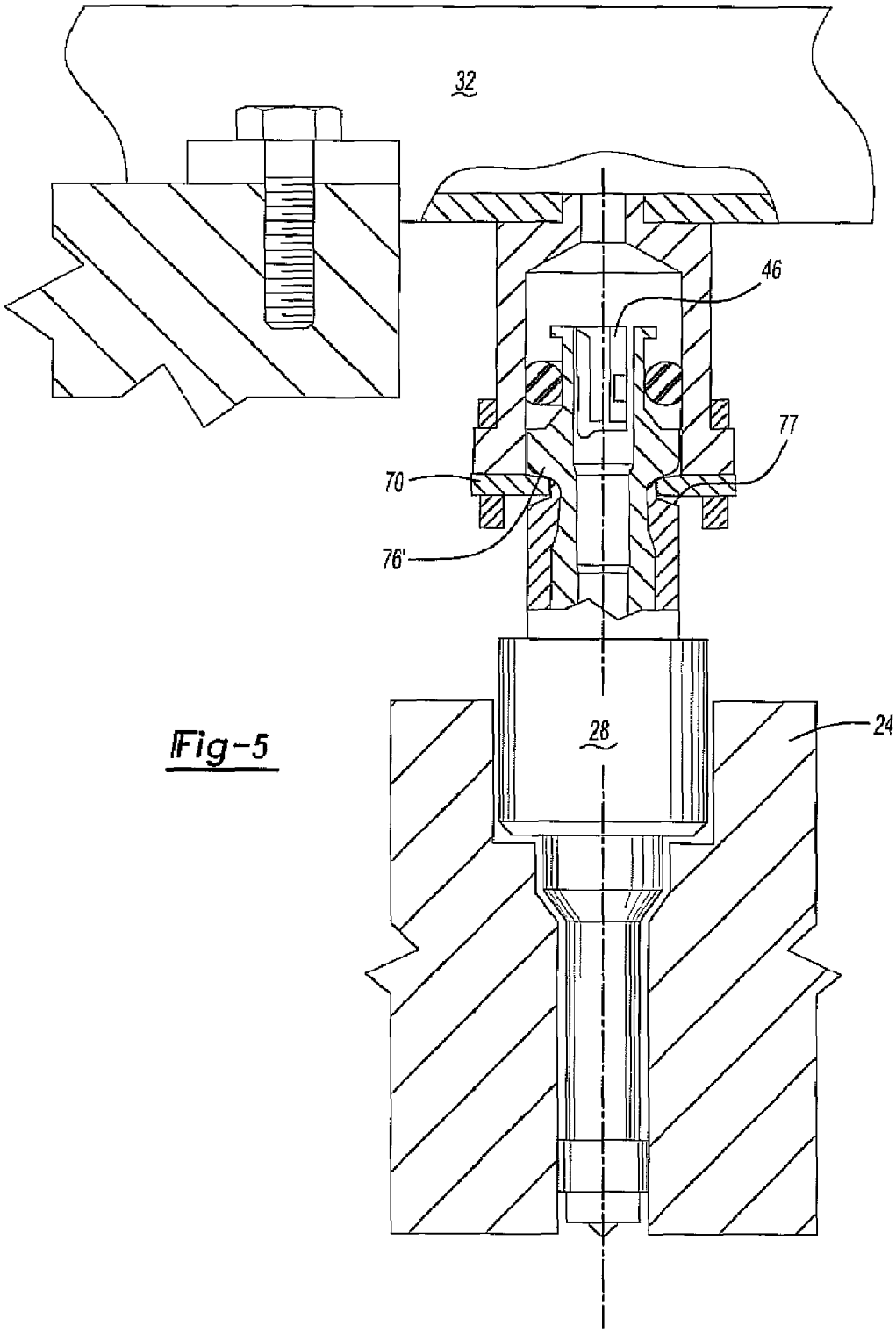
FIG. 5 is a view similar to FIG. 2, but illustrating a modification thereof.

With reference now to FIG. 5, a modification of the fuel nozzle 28 is illustrated which is substantially the same as the fuel nozzle 28 illustrated in FIG. 3 except that the fuel nozzle abutment surface 76', i.e. the surface supported by the clip plate 70, is tapered or curved upwardly toward the inlet end 46 of the nozzle 28 and an annular surface 77 opposed to and facing the surface 76' is tapered downwardly.

Figure 6:
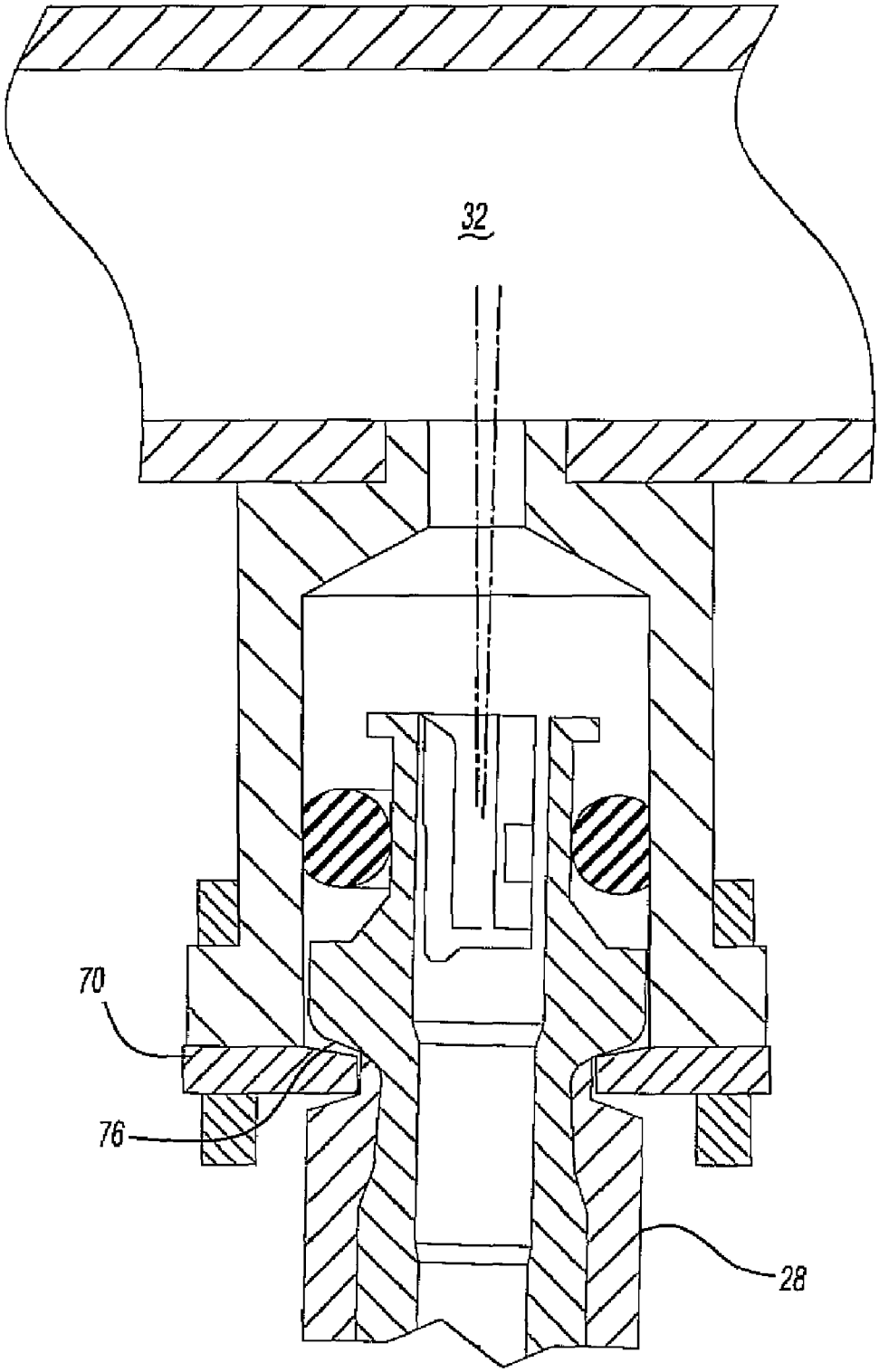
FIG. 6 is a view similar to FIG. 5, but illustrating the fuel injector in a pivotal position.

The tapered surfaces 76' and 77 on the injector 28 thus allow the injector 28 to swivel or pivot slightly, as shown in FIG. 6, and thus minimize or at least reduce the bending arm of the fuel injector 28, i.e. reducing or minimizing the distance between the point of contact between the injector 28 and clip plate 70 on diametrically opposite sides of the nozzle 28.

Figure 7:
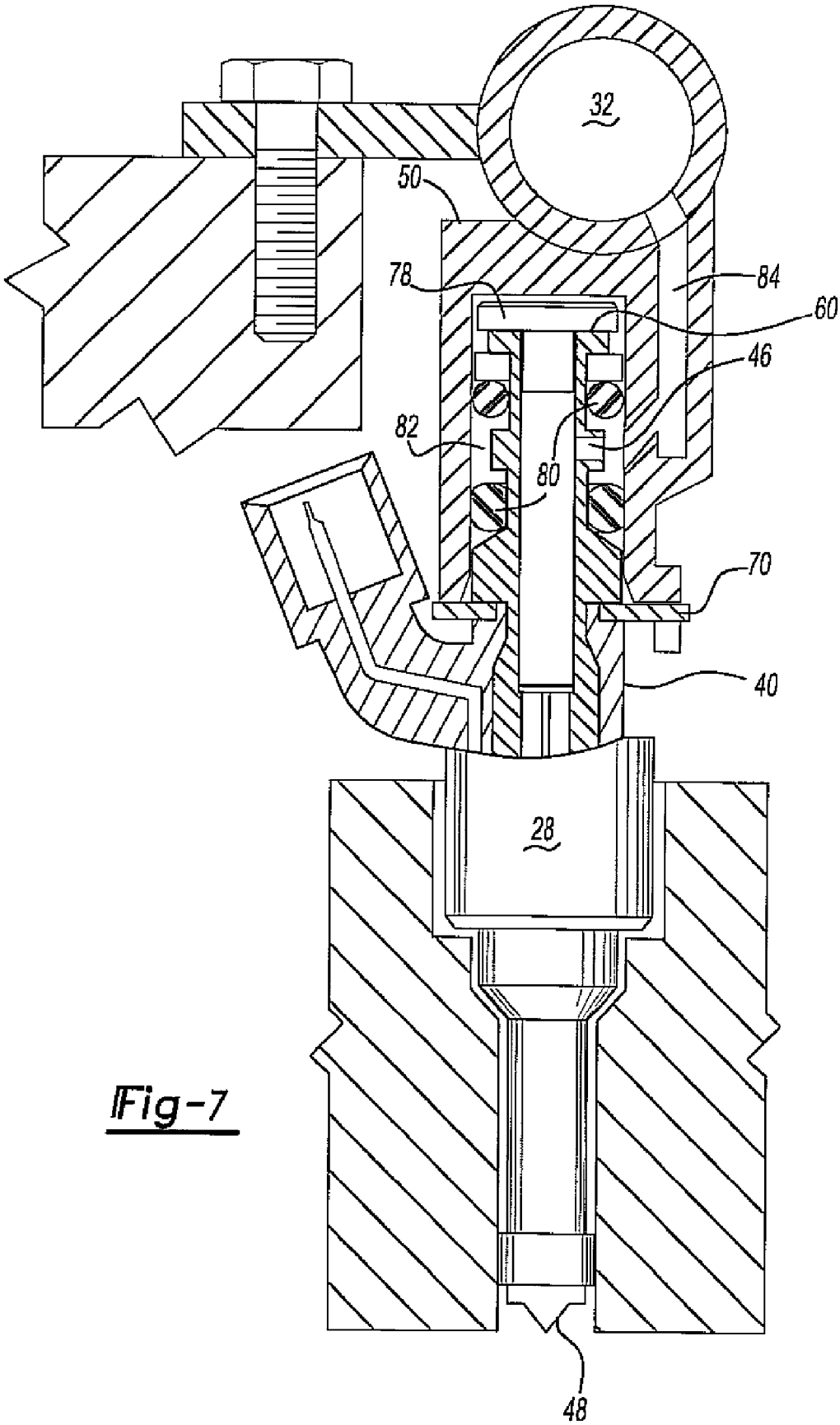
FIG. 7 is a view similar to FIG. 2, but illustrating a modification thereof.

With reference now to FIG. 7, a still further modification of the present invention is illustrated in which the inlet 46 to the fuel injector 28 extends radially outwardly from the portion of the fuel injector main body 40 that is positioned within the injector cup 50. As such, the inlet 46, which may also include several circumferentially spaced inlet ports, is spaced from an upper end 60 of the fuel injector 28.

A pair of axially spaced seals or O-rings 80 are then disposed around the main body 40 of the fuel injector 28 such that the O-rings 80 form an annular fuel inlet chamber 82 which is open to the fuel inlet 46. In addition, the fuel rail 32 is fluidly connected by a passageway 84 to this annular fuel inlet chamber 82. This fuel passageway 84 may be formed in the injector cup 50 or be separate from the injector cup 50.

In operation, high pressure fuel flow from the fuel rail 32 flows through the passageway 84 and into the annular fuel inlet chamber 82. From the annular inlet chamber 82, the fuel flows through the injector inlet 46 and ultimately to its outlet 48 in the conventional fashion.

Any pressure pulsations that are contained within the fuel flow from the fuel rail 32 act equally on both O-rings 80 thus providing a longitudinal force on the fuel injector 28 in equal but opposite longitudinal directions. This, in turn, minimizes the downward force on the fuel injector 28 and thus the stress imposed on the clip plate 70 as well as vibrations imparted on the engine block 24.

Figure 8:
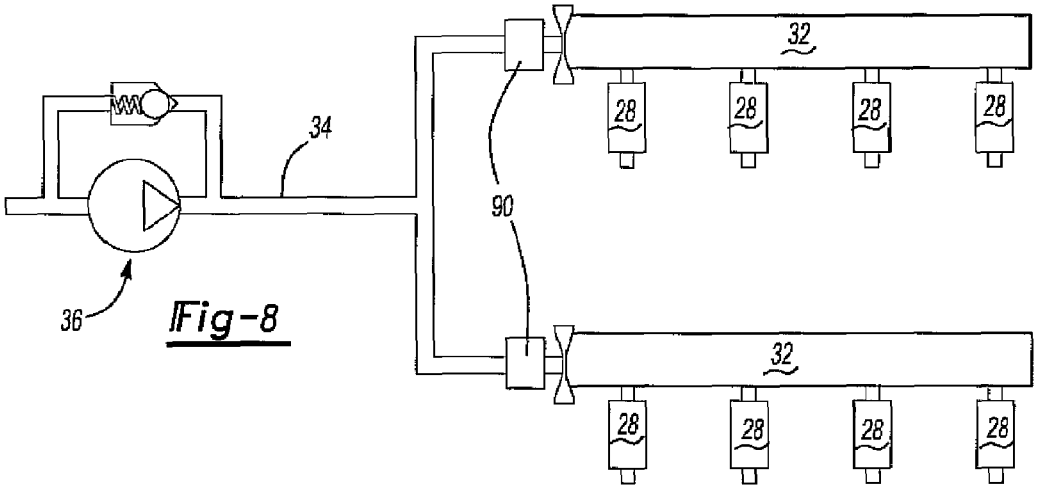
FIG. 8 is a diagrammatic view illustrating another form of the present invention.

With reference now to FIG. 8, a still further strategy and apparatus for reducing the transmission of fuel pump pressure pulsations to the engine block is also shown in which the fuel pump 36 is connected by the fuel pipe 34 to one or more fuel rails 32. In order to reduce the transmission of the fuel pump pulsations to the fuel rails 32, and thus to the fuel injectors 28, a fuel reservoir 90 is positioned fluidly in series with the fuel pipe 34 and preferably immediately upstream from each fuel rail 32. Alternately, the fuel reservoir 90 may form the fluid connection from the fuel pipe 34 and the fuel rails 32.

The fuel reservoir 90 is rigid in construction and has an inside diameter preferably in the range of 1.2 d-1.5 d where d is the inside diameter of the fuel pipe 34. In practice, such sizing of the fuel reservoir 90 simply, but effectively, dampens and attenuates the fuel pump vibrations conveyed to the fuel rails 32.

Although the fuel reservoirs 90 are illustrated in FIG. 8 as being cylindrical in cross-sectional shape, such a cylindrical shape is not required to create the desired attenuation of the fuel pump pulsations. Rather, a simple rounded or tapered bulge 91 may form the reservoir 90 as shown in FIG. 11 and will suffice to adequately attenuate such vibrations.

Figure 9:
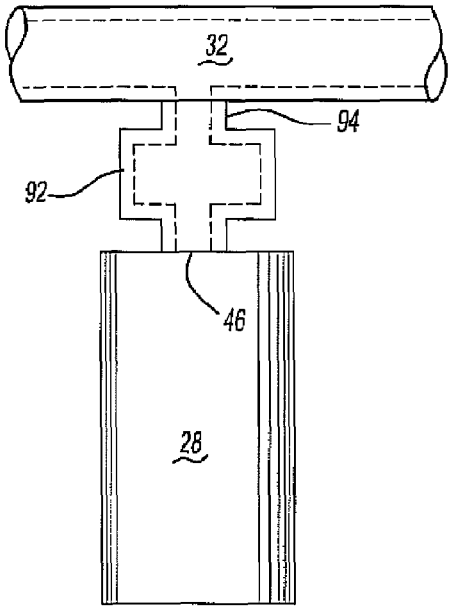
FIG. 9 is a diagrammatic view illustrating a further form of the present invention.

With reference now to FIG. 9, a modification of the invention is illustrated in which a fuel reservoir 92 is still positioned in series between the fuel pump 36 and the fuel injector 28. However, unlike the fuel reservoir 90 illustrated in FIG. 8, the fuel reservoir 92 illustrated in FIG. 9 disposed fluidly in series between the fuel rail 32 and the inlet 46 for each fuel injector 28.

The reservoir 92 is also rigid in construction and is preferably cylindrical in shape. Furthermore, an inside diameter of the reservoir 92 is preferably in the range of 1.2 d-1.5 d where d equals the diameter of the fluid in the port 94 to the fluid reservoir 92.

Figure 10:
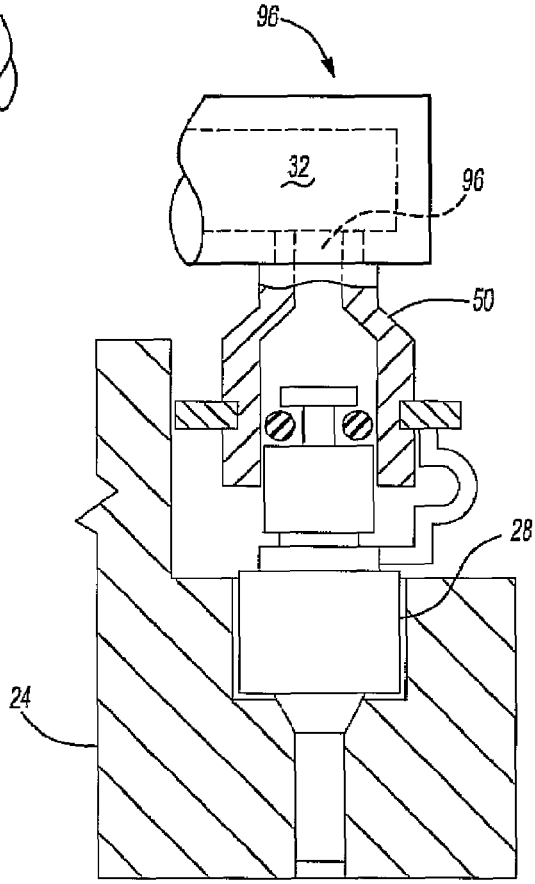
FIG. 10 is a diagrammatic view illustrating a still further form of the present invention.

With reference now to FIG. 10, a still further embodiment of the present invention is shown which attenuates the transmission of fuel pulsations caused by the fuel pump from the fuel rail to the engine block 24. In FIG. 10, a restricted orifice 96 fluidly connects the fuel rail 32 to the injector cup 50 which receives the fuel injector 28. This restricted orifice 96, which is preferably approximately 0.5 of the size of the fuel injector inlet, effectively attenuates the transmission of fuel pump pressure pulsations and resulting vibrations to the engine block 24.

From the foregoing, it can be seen that the present invention provides both a method and apparatus to effectively reduce and attenuate the transmission of pulsations and vibrations from the fuel pump in a direct injection internal combustion engine to the engine block.

Having described our invention, however, many modifications thereto will become apparent to those skilled in the art to which it pertains without deviation from the spirit of the invention as defined by the scope of the appended claims.

The invention claimed is:

1. For use in conjunction with a direct injection internal combustion engine having at least one fuel rail, an engine block, a combustion chamber in the engine block and a passageway in the engine block to the combustion chamber, a direct injection nozzle assembly comprising:

a direct injection fuel [nozzle] *injector* having a main body with a fuel inlet and a *nozzle* tip with a fuel outlet, an injector cup secured to the fuel rail, said injector cup having an open end cavity in fluid communication with the fuel rail and dimensioned to receive a portion of said main body [of said fuel injector], and an injector holder assembly which secures said *direct injection* fuel injector to the injector cup so that said nozzle tip [of said fuel injector] is positioned within [but] *the engine block passageway, and said nozzle tip and said main body are* spaced from the engine block passageway, wherein said injector holder assembly comprises a clip holder attached to said injector cup and a clip plate attached to said clip holder, said clip plate having a portion in abutment with an abutment surface on said [fuel injector] main body so that said clip plate supports said *direct injection* fuel injector against movement towards the engine block, wherein said abutment surface on said fuel injector main body extends laterally outwardly from the fuel injector main body and tapers curvilinearly upwardly away from said fuel injector tip.

2. The invention as defined in claim 1 wherein said injector cup comprises at least two circumferentially spaced and outwardly extending tabs, and wherein said clip holder includes at least two openings which receive said tabs.

3. The invention as defined in claim 1 wherein said injector cup comprises at least three circumferentially spaced and outwardly extending tabs, and wherein said clip holder includes at least three openings which register with and receive said tabs.

4. The invention as defined in claim 2 wherein said injector clip comprises at least two protrusions, one protrusion being positioned in each of said at least two clip holder openings.

5. The invention as defined in claim 1 and comprising a tip seal disposed around said *nozzle* tip [of said fuel injector] so that an outer surface of said tip seal is in abutment with the engine block.

6. The invention as defined in claim 5 wherein said tip seal is constructed of a non-metallic material.

7. The invention as defined in claim 1 wherein [said abutment surface on] said [fuel injector] main body [extends laterally outwardly from the fuel injector main body and tapers upwardly away from said fuel injector tip] *includes a downwardly tapered surface opposed to and facing said abutment surface*.

8. The invention as defined in claim 1 and comprising a seal disposed around said main body [of said fuel injector] within said injector cup cavity, said seal having an outer surface in sealing contact with said injector cup.

9. The invention as defined in claim 1 and comprising a pair of spaced seals disposed around said main body [of said fuel injector] within said injector cup cavity, said seals each having an outer surface in sealing contact with said injector cup and wherein said seals form an annular fluid chamber between said injector cup and said *direct injection* fuel injector, said injector fuel inlet being open to said annular fluid chamber.

10. A method of dampening transmission of fuel pump vibration to an engine block in a direct injection internal combustion engine having a fuel rail connected to the fuel pump and at least one direct injection fuel [nozzle] *injector* having a main body comprising the steps of:

suspending the direct injection [nozzle] *fuel injector* from the fuel rail so that a portion of the direct injection [nozzle] *fuel injector* is positioned within an engine block passageway without direct contact with the engine block, and fluidly sealing the direct injection [nozzle] *fuel injector* to the engine block with a seal, wherein the direct injection [nozzle] *fuel injector* includes a fuel inlet, and further comprising the steps of:

providing a pair of axially spaced apart O-rings around the main body [of the direct injection fuel nozzle] so that the O-rings form an annular fluid chamber around the main body [of the direct injection nozzle], the fuel inlet of the [nozzle] *direct injection fuel injector* being in direct fluid communication with the annular fluid chamber, and directly fluidly connecting the annular fluid chamber with the fuel rail.

11. The invention as defined in claim 10 wherein said suspending step further comprises the step of pivotally suspending the direct injection [nozzle] *fuel injector* to the fuel rail.

12. For use in conjunction with a direct injection internal combustion engine having at least one fuel rail, an engine block, a combustion chamber in the engine block and a passageway in the engine block to the combustion chamber, a direct injection nozzle assembly comprising:

a direct injection fuel [nozzle] *injector* having a main body with a fuel inlet and a *nozzle* tip with a fuel outlet, an injector cup secured to the fuel rail, said injector cup having an open end cavity in fluid communication with the fuel rail and dimensioned to receive a portion of said main body [of said fuel injector], an injector holder assembly which secures said *direct injection* fuel injector to the injector cup so that said nozzle tip of said *direct injection* fuel injector is positioned within [but spaced from] the engine block passageway, *and said nozzle tip and said main body are spaced from the engine block passageway*, and a pair of spaced seals disposed around said main body [of said fuel injector] within said injector cup cavity, said seals each having an outer surface in sealing contact with said injector cup and wherein said seals form an annular fluid chamber between said injector cup and said *direction injection* fuel injector, said injector fuel inlet and the fuel rail both being directly fluidly connected to said annular fluid chamber.

*13. The direct fuel injection assembly of claim 1, wherein said abutment surface on said main body extends laterally outwardly from the fuel injector main body and tapers curvilinearly upwardly away from said fuel injector tip.*

*14. The direct fuel injection assembly of claim 1, wherein said clip plate is supported on an opposite surface to a surface thereof in abutment with the abutment surface of said main body by said clip holder and supports the movement of said direct injection fuel injector toward the engine block.*

*15. A fuel delivery system for delivering fuel to a direct injection internal combustion engine comprising a fuel pump, a direct injection fuel injector, and a fuel rail being rigid in a construction and fluidly connected to said fuel pump and said direct injection fuel injector, said direct injection fuel injector injecting fuel from a passageway in communication with a combustion chamber in an engine block into said combustion chamber,*

*wherein said direct injection fuel injector has a main body including a fuel inlet and a nozzle tip with a fuel injection port,*

*wherein said fuel rail has an injector cup having an end opening space fluidly connected to the fuel rail, said injector cup being dimensioned to be formed so as to receive a portion of said main body,*

*wherein said direct injection fuel injector is secured to said injector cup and comprises an injector holder assembly for positioning the nozzle tip in the engine block passageway, with the main body and the nozzle tip being spaced from said engine block passageway,*

*wherein said injector holder assembly has a clip holder attached to said injector cup and a clip plate attached to said clip holder, said clip plate being in abutment with an abutment surface of said main body so as to regulate movement of the direct injection fuel injector toward the engine block, and*

*wherein said abutment surface of said fuel injector main body extends laterally outwardly from the fuel injector main body and tapers curvilinearly upwardly away from said nozzle tip.*

*16. The fuel delivery system as defined in claim 15 and comprising a pipe having one end fluidly connected to said fuel pump and a second end fluidly connected with said fuel rail.*

*17. The fuel delivery system as defined in claim 15 and comprising a fuel reservoir fluidly connected in series between said fuel pump and said direct injection fuel injector.*

*18. The fuel delivery system as defined in claim 15 wherein said injector cup comprises at least two circumferentially spaced and outwardly extending tabs, and wherein said clip holder includes at least two openings which receive said tabs.*

*19. The fuel delivery system as defined in claim 15 wherein said injector cup comprises at least three circumferentially spaced and outwardly extending tabs, and wherein said clip holder includes at least three openings which register with and receive said tabs.*

*20. The fuel delivery system as defined in claim 18 wherein said injector clip comprises at least two protrusions, one protrusion being positioned in each of said at least two clip holder openings.*

*21. The fuel delivery system as defined in claim 15 and comprising a tip seal disposed around said nozzle tip so that an outer surface of said tip seal is in abutment with the engine block.*

*22. The fuel delivery system as defined in claim 21 wherein said tip seal is constructed of a non-metallic material.*

*23. The fuel delivery system as defined in claim 15 wherein said abutment surface on said main body extends laterally outwardly from the main body and tapers upwardly away from said nozzle tip.*

*24. The fuel delivery system as defined in claim 23 wherein said main body includes a downwardly tapered surface opposed to and facing said abutment surface.*

*25. The fuel delivery system as defined in claim 15 and comprising a seal disposed around said main body within said injector cup cavity, said seal having an outer surface in sealing contact with said injector cup.*

*26. The fuel delivery system as defined in claim 15 and comprising a seal disposed around said main body within said injector cup cavity, said seal having an outer surface in sealing contact with said injector cup and wherein said seals form an annular fluid chamber between said injector cup and said direct injection fuel injector, said fuel inlet being open to said annular fluid chamber.*

*27. The fuel delivery system of claim 15, wherein said clip plate is supported on an opposite surface to a surface thereof in abutment with the abutment surface of said main body by said clip holder and supports the movement of said direct injection fuel injector toward the engine block.*

* * * * *